United States Patent [19]
Bailey et al.

[11] Patent Number: 5,577,658
[45] Date of Patent: Nov. 26, 1996

[54] GAS KNIFE COOLING SYSTEM

[75] Inventors: Joel B. Bailey, Arlington; Sabi Avramescu, Colleyville; Tad Formella, Mansfield, all of Tex.

[73] Assignee: Electrovert USA Corp., Camdenton, Mo.

[21] Appl. No.: 493,552

[22] Filed: Jun. 23, 1995

[51] Int. Cl.⁶ ........................................ H05K 3/34
[52] U.S. Cl. ........................ 228/222; 228/231; 228/46
[58] Field of Search .................. 228/42, 46, 219, 228/222, 223, 231, 232

[56] References Cited

U.S. PATENT DOCUMENTS

| | | | |
|---|---|---|---|
| 4,771,929 | 9/1988 | Bahr et al. | 228/232 |
| 4,912,857 | 4/1990 | Parent et al. | 34/148 |
| 5,125,556 | 6/1992 | Deambrosio | 228/42 |
| 5,364,007 | 11/1994 | Jacobs et al. | 228/42 |

*Primary Examiner*—Samuel M. Heinrich
*Attorney, Agent, or Firm*—Darby & Darby, P.C.

[57] ABSTRACT

A gas knife cooling system for reflow soldering cools soldered articles by impinging a gas flow directly on the articles and as a result uses less cooling gas. A heater is associated with the cooling system to remove flux deposits. The cooling system is installed in the cooling section of a reflow soldering apparatus and comprises at least one gas knife to direct a gas stream at soldered products passing through the cooling section on a conveyor. A heater is associated with the gas knife which is activated for predetermined cleaning cycles to heat the gas knife to a temperature above flux vaporization temperature of flux deposits from the soldered products.

18 Claims, 2 Drawing Sheets

5,577,658

GAS KNIFE COOLING SYSTEM

TECHNICAL FIELD

The present invention relates to reflow soldering and more specifically to cooling soldered articles immediately after soldering.

BACKGROUND ART

Printed circuit board assemblies are cooled after reflow soldering to reduce the temperature of the soldered articles below the melting temperature of the solder. In reflow soldering the articles to be soldered are first covered with a solder paste containing flux which is then heated in at least one heat zone so that the solder melts and the flux liquifies permitting the solder to flow and cover the joint or area to be soldered. After heating, the soldered articles pass into a cooling section where the solder is cooled below the melting temperature, thus hardening the solder on the circuit board assemblies. In most cases there is also some liquid or solid flux deposits on the solder which forms in the cooler section.

One example of a reflow soldering apparatus is disclosed in U.S. Pat. No. 5,125,556 to Deambrosio and one example of a cooling unit for a reflow soldering system is disclosed in U.S. Pat. No. 4,912,857 to Parent et al. The cooling unit is generally a separate section and incorporates moving ambient gas via fans or blowers through a heat exchanger. The recirculation of the ambient gas can cause problems with regard to flux deposits in the heat exchangers and within the flow actuators. These deposits can cause clogging of the heat exchangers and flow actuators which can degrade the cooling performance over time. This results in increased maintenance and down time.

Various methods of reducing flux deposits in the cooling section have been attempted. One remedy is a filtration system wherein gases in the reflow heating zones are passed through a filtering medium before entering the cooling zone. This technique is not always effective as it is difficult to filter out the flux components when in the vapour phase. Thus, filter systems may slow the accumulation of flux deposits in the cooling zone, but they do not solve the problem.

Another suggested scheme is a cleaning cycle for the entire reflow apparatus. In this system, the heating zones and the cooling zones are heated to a temperature which allows flux deposits within the oven to vaporize. Such a procedure, however, has a number of problems, one of them being due to the large thermal mass of the heating zones requiring high heating energy which is both costly and time consuming. There is a three step process which heats up, bakes out and cools down the complete apparatus. This requires the shut down of the reflow apparatus. Another problem is that the recirculating coolant must be entirely purged from the heat exchanger used in the cooling zone, otherwise it may rupture as a result of high pressure at elevated cleaning temperatures. This last point is of concern because a failure of the purge system could result in personal injury.

In most cooling sections of a reflow soldering apparatus, a high circulation of ambient gas passes through a heat exchanger to cool the gas. The soldered articles are then conveyed through the cooled gas. The two most common gases used in this cooling system are air and nitrogen. Nitrogen provides an inert process environment and much brighter solder joints are obtained in a nitrogen atmosphere as oxidation does not occur on the surface of the solder.

DISCLOSURE OF INVENTION

It is an aim of the present invention to provide a cooling system for reflow soldering which reduces flux deposits on heat exchangers and flow actuators in the cooling section. This aim is achieved by supplying at least one gas stream directed specifically at the soldered articles conveyed through the cooling section, thus a reduced gas flow is used for cooling to harden the solder because it is directed specifically at the soldered articles. The gas stream is produced in a gas knife and a cleaning cycle is provided as required to heat the gas knife to a temperature above flux vaporization, thus removing flux deposits on the gas knife.

The expression "gas knife" used herein refers to any device that provides a suitable gas stream, or an impinging flow cooling system to cool an object. Gas knife should be considered as a gas flow actuator such as slot nozzles, round nozzles or arrays of nozzles positioned to provide an impinging gas flow.

The present invention provides a gas knife cooling system for a reflow soldering apparatus having a heating section followed by a cooling section, with a conveyor for carrying products to be soldered through the apparatus, the gas knife cooling system comprising at least one gas knife in the cooling section positioned to direct a gas stream at soldered products on the conveyor to cool the products, and including a heater associated with the gas knife activated for predetermined cleaning cycles to heat the gas knife to a temperature above flux vaporization temperature of flux deposits from the soldered products.

There is also provided a method of cooling soldered products passing on a conveyor from the heating section of a reflow soldering apparatus to a cooling section comprising the steps of directing at least one gas stream onto the soldered products in the cooling section to cool the products, providing cleaning cycles from time to time wherein the gas is heated above flux vaporization temperature of flux deposits from the soldered products.

BRIEF DESCRIPTION OF DRAWINGS

In drawings which illustrate embodiments of the present invention.

BEST MODE FOR CARRYING OUT THE INVENTION

Figure 1:
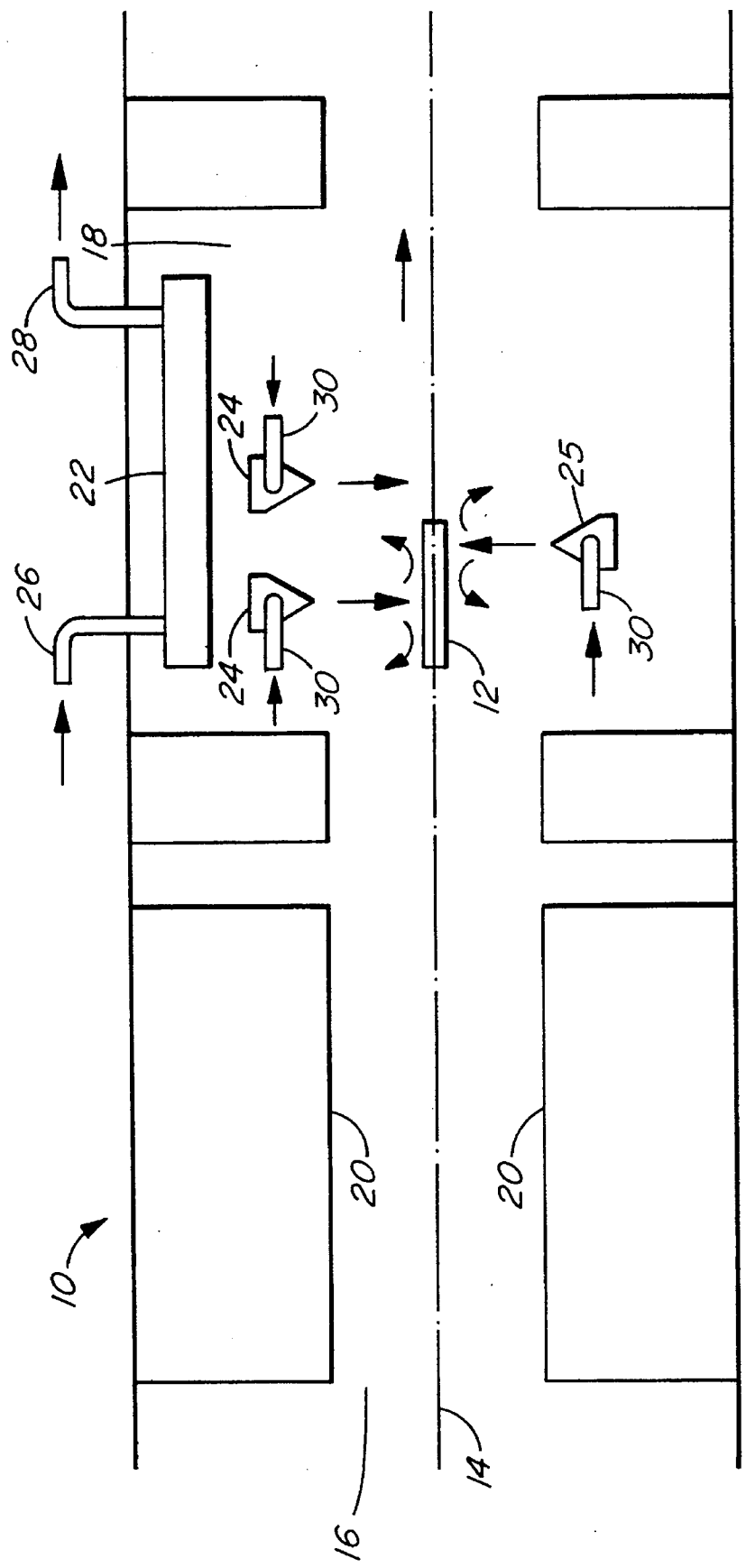
FIG. 1 is a side elevational schematic view showing one embodiment of a cooling section of a reflow soldering apparatus according to the present invention.

A reflow soldering apparatus 10 according to one embodiment is shown in FIG. 1 wherein a printed circuit board assembly 12 or other article to be soldered is conveyed on a conveyor 14 through a heating section 16 to a cooling section 18. Infrared heaters 20 are shown in the heating section 16, however, these heaters are but one type of heater used in a reflow soldering apparatus. Heated gas forced convection systems may be used, or any other suitable heating system that heats the articles 12 passing on the conveyor 14 through the heating section 16.

In the cooling section 18 a heat exchanger 22 is mounted above a plurality of upper gas knives 24 which direct gas streams onto the top of the soldered articles 12 passing on the conveyor 14. A lower gas knife 25 is shown positioned below the conveyor 14 so that a gas stream is directed onto the underside of the soldered articles 12. The heat exchanger 22 cools and stabilizes the ambient temperature of the gas in the cooling section 18. This stabilization is desirable when there is heavy product loading through the cooling section 18. Each of the soldered articles 12 is cooled giving up heat which is dissipated in the cooling section 18. A separate cooling system provides a circulated coolant which may be air or other gas, water or water/glycol mixture, or other coolant mixtures, to pass through entry 26 into the heat exchanger 22 and out through exit 28. In other types of reflow soldering devices the heat exchanger may utilize convective cooling with heat dissipation fins or electronic cooling or other suitable cooling means. A heat exchanger 22 may be located under the lower gas knife 25, beneath the conveyor 14, or outside the cooling section altogether. The heat exchanger cooling system is quite separate to the gas streams from the gas knives 24,25. In certain applications a heat exchanger 22 is not required.

Because the gas knives 24,25 are producing a directed gas stream rather than the more typical gas circulation systems utilizing blowers, the problem of condensation or clogging of the heat exchanger 22 with flux deposits does not occur because the process gases do not circulate therethrough.

The gas flow to the gas knives 24,25 is from a separate source and is generally not recirculated. The source of compressed gas may be an air compressor, compressed bottle gas, a nitrogen tank or other suitable source. The gas is delivered approximately at room temperature or slightly below, therefore is not cooled before passing through the gas entry line 30 to the gas knives 24,25.

Figure 2:
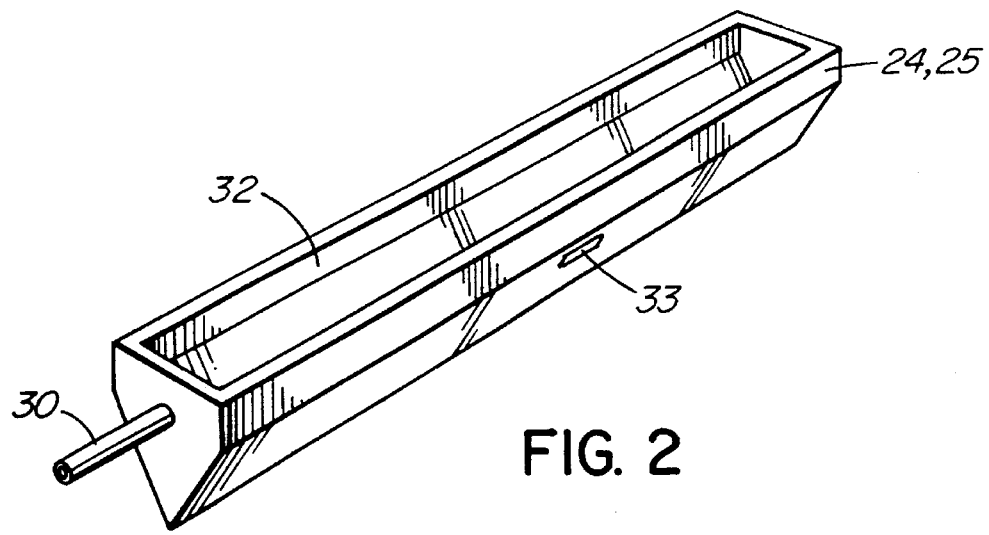
FIG. 2 is an isometric view showing a gas knife according to one embodiment of the present invention.

As shown in FIG. 2, the gas knife 24 has an electric heater 32 positioned at the back thereof to heat the gas knife 24. There is also some heating of the gas passing through the gas knife 24. The temperature of the gas knives 24,25 for a cleaning cycle must be above the vaporizing temperature of the flux, thus the flux deposits vaporize and this prevents a build up of flux deposits on the gas knives 24,25. The cleaning cycle occurs for a sufficient time to vaporize the flux residues, thus the maintenance of the cooling section is far simpler than in the existing types of cooling sections for reflow solder devices where an extensive heat cycle is necessary to remove flux deposits.

The vaporized flux deposits generally exit from exhausts at each end of the soldering apparatus 10. Because the gas supplied to the gas knives 24,25 is from a separate source, there is a continuous flow of gas out of the cooling section 18. This continuous gas flow evacuates the flux vapour in part which allows it to be removed from the system by the exhausts at the end of the soldering apparatus 10. Some flux vapour may condense on the walls of the soldering apparatus and some may also re-condense on the gas knives 24,25. However, because the surface area of the gas knives is small compared to the overall surface area of the apparatus, there is only a slight build up of flux deposits.

Figure 3:
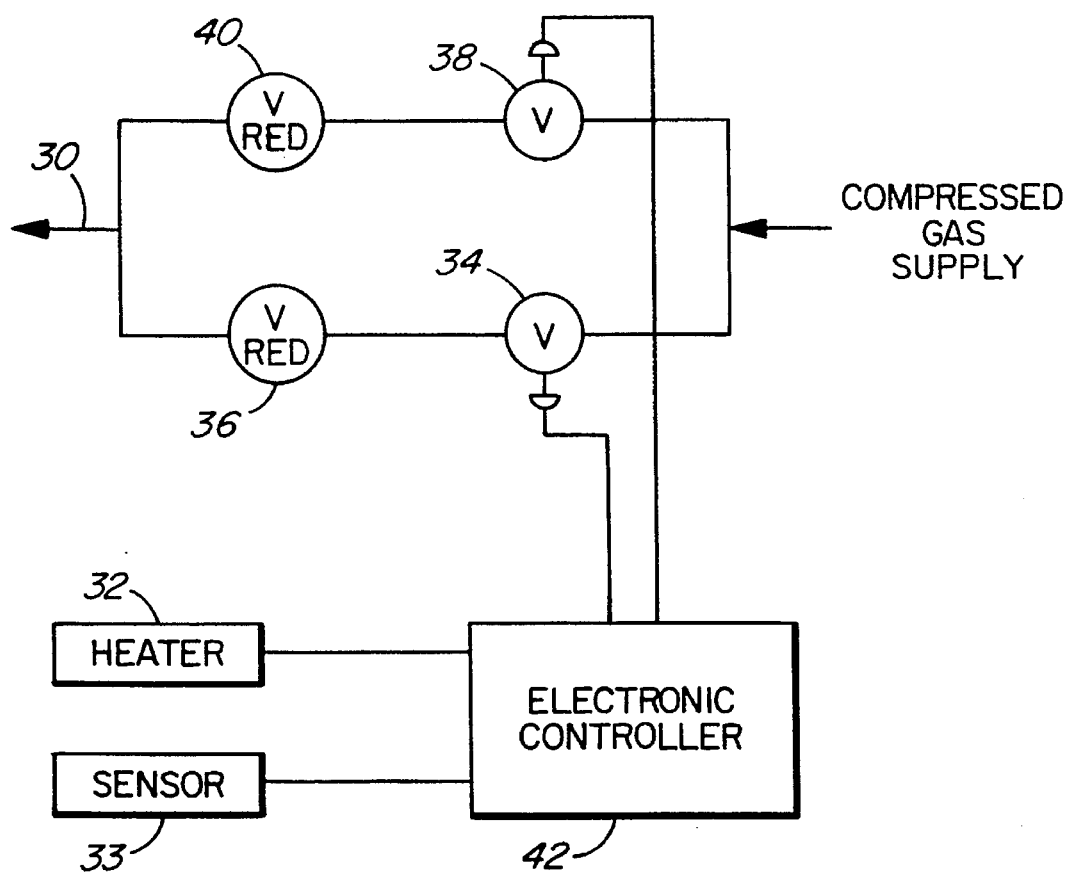
FIG. 3 is a block diagram showing a control system for operating the gas knife cooling system according to one embodiment of the present invention.

The number and location of gas knives 24,25 are determined by the amount of heat transfer desired. The gas knives are fed gas through a flow controller as shown in FIG. 3. At least one gas knife has a thermocouple 33 referred to as the temperature sensor in FIG. 3. The thermocouple 33 provides a closed loop control of the heater.

Whereas two upper gas knives 24 are shown and one lower gas knife 25, in some types of reflow soldering devices only a single gas knife, preferably directing a gas stream on the top surface of the soldered product, is required.

The purpose of the heat exchanger is to maintain the required temperature in the cooling section. In operation cool gas from an exterior source is directed from the gas knives 24,25 at the soldered articles 12. The flow of gas through the gas knives is reduced compared to a normal conventional cooling section.

FIG. 3 illustrates a controller arrangement for controlling the gas flow for normal process cooling and for a cleaning cycle. For normal process cooling the gas supply passes through a first valve 34 which is open, a reducing valve 36, and then enters the gas knives 24,25 through line 30. The second valve 38, which provides a second gas supply, is closed during normal cooling. In the cleaning cycle the first valve 34 is closed and the second valve 38 is open, the compressed gas supply passes through a second reducing valve 40 which permits a reduced gas flow for the cleaning cycle as compared to the normal process cooling flow. When the cleaning cycle is commenced, the controller 42 also activates the heaters 32 in the gas knives 24,25, the temperature of the heater 32 is controlled by the thermocouple 33. The heater 32 heats the gas knives 24,25 above the vaporization temperature of the flux so the flux deposits on the gas knives vaporize.

The gas flow per knife is preferably in the range from 100 to 2500 CFH at an input pressure of 30 to 120 psi. Nitrogen is the preferred gas although other types of suitable gases may be used. In some instances air may be circulated in the cooling section. The process flow rate is adjusted based on the amount of heat exchange required, that is to say, the cooling rate is controlled by the gas flow and gas temperature. The cleaning cycle is engaged at intervals appropriate to prevent a build up of flux residue on the gas knives. When the cycle is engaged, the gas flow switches to the low flow condition and the heaters on the knives are energized. Thus, the knife temperature increases and is held at a preset level above the vaporization temperature of flux residues. The cleaning cycle runs for sufficient time for the flux residues to be removed, the electronic controller then switches off the heaters and changes the flow to the process high flow condition for cooling.

The thermal performance of the compressed gas knives is shown through experiment to be equivalent or superior to that of existing cooling modules. A low complexity printed circuit board which measures 5"×7" gave an average liquidus time of 44.25 seconds and a $\Delta_t$ of 3° C. with a standard cooling module. Using the gas knife module of the present invention, the liquidus time was reduced to an average of 37.0 seconds with a $\Delta_t$ of 5° C. An extremely complex board also showed good results. The standard cooling module gave an average liquidus time of 83.2 seconds and a $\Delta_t$ of 47° C. while the gas knife module of the present invention showed an average liquidus time of 80.8 seconds and a $\Delta_t$ of 32° C.

Experiments were performed to test the effect of the high velocity gas stream from the gas knife impinging on solder joints. Tests were run using a two knife module operating at input pressures of 44 and 80 psi and flow rates of 250 and 600 CFH. Boards were also soldered without using a gas knife for reference. The responses evaluated were number solder bridges and number of components moved. Statistical analysis of the data did not show any correlation between component movement and the gas knives.

In the gas knife module, the gas streams do not circulate through the heat exchanger, thus flux deposits do not generally occur in the heat exchanger. The gas knives 24,25 generally provide the coolest surface in the cooling section, and consequently flux deposits form thereon.

Various changes may be made to the embodiments shown herewith without departing from the scope of the present invention which is limited only by the following claims.

The embodiments of the present invention in which an exclusive property or privilege is claimed are defined as follows:

1. A gas knife cooling system for a reflow soldering apparatus having a heating section followed by a cooling section, with a conveyor for carrying products to be soldered through the apparatus, the gas knife cooling system comprising at least one gas knife in the cooling section positioned to direct a gas stream at soldered products on the conveyor to cool the products, and including a heater associated with the gas knife activated for predetermined cleaning cycles to heat the gas knife to a temperature above flux vaporization temperature of flux deposits from the soldered products.

2. The gas knife cooling system according to claim 1 wherein at least one gas knife is positioned above the conveyor directing gas onto the top of the soldered products and at least one gas knife is positioned below the conveyor directing gas onto the underside of the soldered products.

3. The gas knife cooling system according to claim 1 wherein the heater is attached to the gas knife.

4. The gas knife cooling system according to claim 3 including a temperature sensor on the gas knife and including a control system to control the temperature of the gas knife at a predetermined level.

5. The gas knife cooling system according to claim 1 wherein the gas stream from the gas knife is at a higher flow rate for normal process flow than for the cleaning cycles.

6. The gas knife cooling system according to claim 5 including separate flow control valves for the normal process flow and for the cleaning cycle.

7. The gas knife cooling system according to claim 1 wherein the gas stream is nitrogen.

8. The gas knife cooling system according to claim 1 wherein the gas stream is air.

9. The gas knife cooling system according to claim 1 wherein a heat exchanger is provided positioned adjacent the gas knife to stabilize process temperature within the cooling section.

10. A method of cooling soldered products passing on a conveyor from a heating section of a reflow soldering apparatus to a cooling section comprising the steps of:

directing at least one gas stream onto the soldered products in the cooling section to cool the products;

providing cleaning cycles from time to time wherein the gas is heated above flux vaporization temperature of flux deposits from the soldered products.

11. The method of cooling soldered products according to claim 10 wherein the gas stream is projected from a gas knife onto soldered products passing on the conveyor and the gas knife is heated above flux vaporization temperature of flux deposits from the soldered products.

12. The method of cooling soldered products according to claim 10 wherein at least two gas streams are provided, one from a gas knife positioned above the conveyor to direct gas onto the top of the soldered products, and one from a gas knife positioned below the conveyor to direct gas onto the underside of the soldered products.

13. The method of cooling soldered products according to claim 12 wherein heaters are provided on the gas knives to heat the gas knives above flux vaporization temperature.

14. The method of cooling soldered products according to claim 13 wherein a temperature sensor and temperature controller are provided to control the temperature of the gas knives at a predetermined level.

15. The method of cooling soldered products according to claim 10 wherein the gas stream for normal process flow is at a higher flow rate than for the cleaning cycles.

16. The method of cooling soldered products according to claim 10 wherein the gas is nitrogen.

17. The method of cooling soldered products according to claim 10 wherein the gas is air.

18. The method of cooling soldered products according to claim 10 including a heat exchanger to stabilize process temperature within the cooling section.

* * * * *